(12) United States Patent
Niemz

(10) Patent No.: US 8,504,296 B2
(45) Date of Patent: Aug. 6, 2013

(54) METHOD FOR DETERMINING AN ITEM OF TRAVEL DIRECTION INFORMATION FOR A VEHICLE, AND SENSOR DEVICE FOR A VEHICLE

(75) Inventor: Volker Niemz, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 708 days.

(21) Appl. No.: 12/619,402

(22) Filed: Nov. 16, 2009

(65) Prior Publication Data
US 2010/0152957 A1 Jun. 17, 2010

(30) Foreign Application Priority Data
Dec. 15, 2008 (DE) .......................... 10 2008 054 648

(51) Int. Cl.
*G01C 17/38* (2006.01)

(52) U.S. Cl.
USPC ........................................ 701/530

(58) Field of Classification Search
None
See application file for complete search history.

(56) References Cited

U.S. PATENT DOCUMENTS

| | | | |
|---|---|---|---|
| 2004/0044477 A1* | 3/2004 | Jung et al. | 702/5 |
| 2006/0012470 A1* | 1/2006 | Chakam et al. | 340/445 |
| 2006/0235598 A1* | 10/2006 | Kudo | 701/96 |
| 2007/0198184 A1* | 8/2007 | Yoshioka et al. | 701/211 |
| 2007/0213901 A1 | 9/2007 | Shin et al. | |
| 2008/0059061 A1* | 3/2008 | Lee | 701/209 |
| 2008/0281515 A1* | 11/2008 | Ann et al. | 701/210 |
| 2009/0043494 A1* | 2/2009 | Han | 701/208 |
| 2009/0082967 A1* | 3/2009 | Hara et al. | 701/225 |
| 2009/0088969 A1* | 4/2009 | Oota | 701/208 |
| 2009/0143940 A1* | 6/2009 | Rhodes et al. | 701/41 |
| 2009/0271109 A1* | 10/2009 | Lee et al. | 701/208 |

\* cited by examiner

*Primary Examiner* — Thomas Tarcza
*Assistant Examiner* — Adam Alharbi
(74) *Attorney, Agent, or Firm* — Kenyon & Kenyon LLP

(57) ABSTRACT

A method for determining an item of travel information for a vehicle includes: determination of a speed of the vehicle; comparison of the speed with at least one specified comparison speed; if the speed is greater than the at least one specified comparison speed, determination of a yaw rate of the vehicle and determination of the item of travel direction information on the basis of the determined yaw rate; and, if the speed is less than the at least one specified comparison speed, determination of a first wheel path of a first wheel of an axle of the vehicle and a second wheel path of a second wheel of the axle, and determination of the item of travel direction information on the basis of the first wheel path and the second wheel path.

11 Claims, 3 Drawing Sheets

METHOD FOR DETERMINING AN ITEM OF TRAVEL DIRECTION INFORMATION FOR A VEHICLE, AND SENSOR DEVICE FOR A VEHICLE

CROSS-REFERENCE TO RELATED APPLICATIONS

The present application claims priority to Application No. 10 2008 054 648.8, filed in the Federal Republic of Germany on Dec. 15, 2008, which is expressly incorporated herein in its entirety by reference thereto.

FIELD OF THE INVENTION

The present invention relates to a method for determining an item of travel direction information for a vehicle. In addition, the present invention relates to a corresponding sensor device for a vehicle.

BACKGROUND INFORMATION

A vehicle is often equipped with an automatic travel direction specification system, such as an automatic parking system. A travel direction specification system (driver assistance system) fashioned as a parking system is for example designed to give steering instructions to the driver during the process of parking a vehicle in a parking space. The parking system may also be designed for an automatic steering wheel controlling, so that the driver does not himself have to operate the steering wheel while parking, and is thus further relieved of stress.

For safe operation of an automatic travel direction specification system, it is important that the travel direction specifications issued by the travel direction specification system be correctly converted into corresponding directions of travel of the vehicle. For example, a steering wheel angle specified by an automatic parking system is to be correctly converted into a corresponding wheel deflection angle of the moving vehicle. This is ensured by calibrating the parking system before its first use such that for an advantageous wheel deflection angle it outputs a steering wheel angle adapted thereto.

As a rule, it is assumed that the conversion of a steering wheel angle set at the steering wheel into an executed wheel deflection angle (steering wheel angle conversion) will remain constant during operation of a vehicle. Therefore, a post-calibration of the steering wheel angle conversion usually does not take place. However, the steering wheel angle conversion may change significantly during operation of the vehicle. Even slight contact of a wheel of the vehicle with a curb may for example result in track displacement and thus in a changed steering wheel angle conversion. Potholes in a street may also permanently change the mechanics of the steering wheel angle conversion. Thus, during use of a vehicle there is a high probability that changes will occur in the steering wheel angle conversion. In particular, larger deviations between a steering wheel angle conversion before operation of the vehicle and a current steering wheel angle conversion present a potential source of errors during operation of the parking system.

The problem described in the foregoing paragraph relating to the example of a parking system occurs correspondingly in other automatic vehicle direction specification systems.

U.S. Patent Application Publication No. 2007/0213901 describes a system and a method for adapting an executed wheel deflection angle of a vehicle to a target steering wheel angle specified via a positioning of the steering wheel. Here, the wheel deflection angle of at least one wheel of the vehicle is determined on the basis of a measured yaw rate, and is compared to the target wheel deflection angle. If a deviation is determined between the wheel deflection angle and the target wheel deflection angle, at least one wheel of the vehicle is correspondingly adjusted.

However, at low vehicle speeds the yaw rate of a vehicle can be determined only imprecisely. Therefore, the system and the method described in U.S. Patent Application Publication No. 2007/0213901 are poorly suited for parking a vehicle in a parking space. It is therefore desirable to provide a more reliable possibility for determining an item of travel direction information for a vehicle.

SUMMARY

At a comparatively high speed it is considered advantageous to use the determined yaw rate of the vehicle in order to determine an item of travel direction information. Here, a comparatively high speed is to be understood as for example a speed of 30 kph or greater. At such high speeds, the yaw rate supplies a stable and reliable signal with the aid of which the item of travel direction information, for example a wheel deflection angle, can be determined very precisely and with a low error rate. However, due to the intrinsic noise of the yaw rate signal at low vehicle speeds, it is more advantageous not to use the yaw rate to determine the item of travel direction information, but rather instead to determine the item of travel direction information via an evaluation of the specific wheel paths of the rear wheels and/or of the front wheels. This is advantageous because the specific wheel paths of the rear wheels and of the front wheels can be easily and reliably determined at a comparatively low speed of the vehicle, for example a speed below 30 kph.

Thus, if the speed is greater than the at least one specified comparison speed, the item of travel direction information is determined on the basis of the determined yaw rate, not taking into account the first wheel path and the second wheel path, and if the speed is less than the at least one specified comparison speed, the item of travel direction information is determined on the basis of the first wheel path and the second wheel path, not taking into account the vehicle yaw rate.

In particular, a yaw rate corrected with regard to fluctuations caused by speed, a wheel deflection angle, and/or a target steering wheel angle may be used as an item of vehicle direction information. A target steering wheel angle is to be understood as a position of the steering wheel that, with respect to a specification of the vehicle manufacturer or a repair shop, corresponds to the determined yaw rate or to the first wheel path and to the second wheel path. The target steering wheel angle can subsequently be compared to an actual steering wheel angle that corresponds to the current position of the steering wheel.

The speed may be compared to a first specified comparison speed and to a second specified comparison speed, and, if the speed is greater than the first specified comparison speed and less than the second specified comparison to the, the item of travel direction information is calculated from a first item of partial travel direction information determined on the basis of the ascertained yaw rate of the vehicle, and a second item of partial travel direction information determined on the basis of the first wheel path and of the second wheel path. Thus, even in a transitional speed range, for example between 25 kph and 35 kph, a reliable determination of the item of travel direction information is ensured.

Example embodiments of the present invention provide a method for determining a conversion relation relating to a conversion of a travel direction specification into a direction of travel of a vehicle, including: determination of at least one item of travel direction information relating to at least one travel direction specification according to one of the methods in the foregoing paragraphs, and determination of the conversion relation relating to the conversion of a travel direction specification into a direction of travel on the basis of the at least one travel direction specification and the at least one item of travel direction information. Example embodiments of the present invention thus offer, for example, the possibility of recognizing deviations that occur as the vehicle ages in the conversion of a travel direction specification into a travel direction, and correspondingly adapting the conversion relation.

For example, when the vehicle is traveling in the forward direction a large number of items of travel direction information are determined for a large number of travel direction specifications, and when the vehicle is traveling in reverse a large number of items of travel direction information are determined for a large number of travel direction specifications, a conversion relation being defined that is a function of whether the vehicle is traveling forward or backward. The method thus reacts in a targeted manner to problems that occur either during forward travel or during reverse travel.

Example embodiments of the present invention also provide a method for operating an automatic travel direction specification system of a vehicle, including: outputting of at least one travel direction specification by the automatic travel direction specification system; determination of a conversion relation regarding a conversion of a travel direction specification into a direction of travel of the vehicle according to the methods in the foregoing paragraphs; and determination of a corrected travel direction specification for at least one additional travel direction specification of the automatic travel direction specification system, using the conversion relation. Thus, the travel direction specifications of the automatic travel direction specification system can be adapted to the current state of the vehicle components for the conversion of a travel direction specification into a direction of travel. This ensures uniform quality of the functioning of the automatic travel direction specification system for the entire lifetime of the system.

The advantages described in the foregoing paragraphs are also ensured in a corresponding sensor device and in a vehicle having the sensor device, in an automatic travel direction specification system, and in a travel direction correction device that is designed to determine a corrected travel direction specification, using the conversion relation, for at least one additional travel direction specification of the automatic travel direction specification system. The travel direction correction device may be a subunit of the sensor device or of the automatic travel direction specification system.

The data system is to be understood as, for example, a vehicle bus having at least one sensor coupled thereto. Likewise, the data output system may be at least one sensor situated inside the sensor device. In addition, the data output system may be a plurality of sensors situated separately from one another that are installed on the vehicle external to the sensor device and are connected to the sensor device via lines. It is explicitly indicated here that the data output system is not limited to a self-contained system.

The determination of the wheel deflection angle on the basis of the set steering wheel angle is an important task for a parking system. Even small errors in the steering wheel angle can cause, after driving by a potential parking space, a false orientation or positional calculation of the vehicle, which can result either in enormous deviations during the parking process or in unjustified rejection of the parking space. For this reason, it is advantageous for the steering wheel angle conversion to be post-calibrated.

Additional features and aspects of example embodiments of the present invention are described in more detail below with reference to the appended Figures.

DETAILED DESCRIPTION

Figure 1:
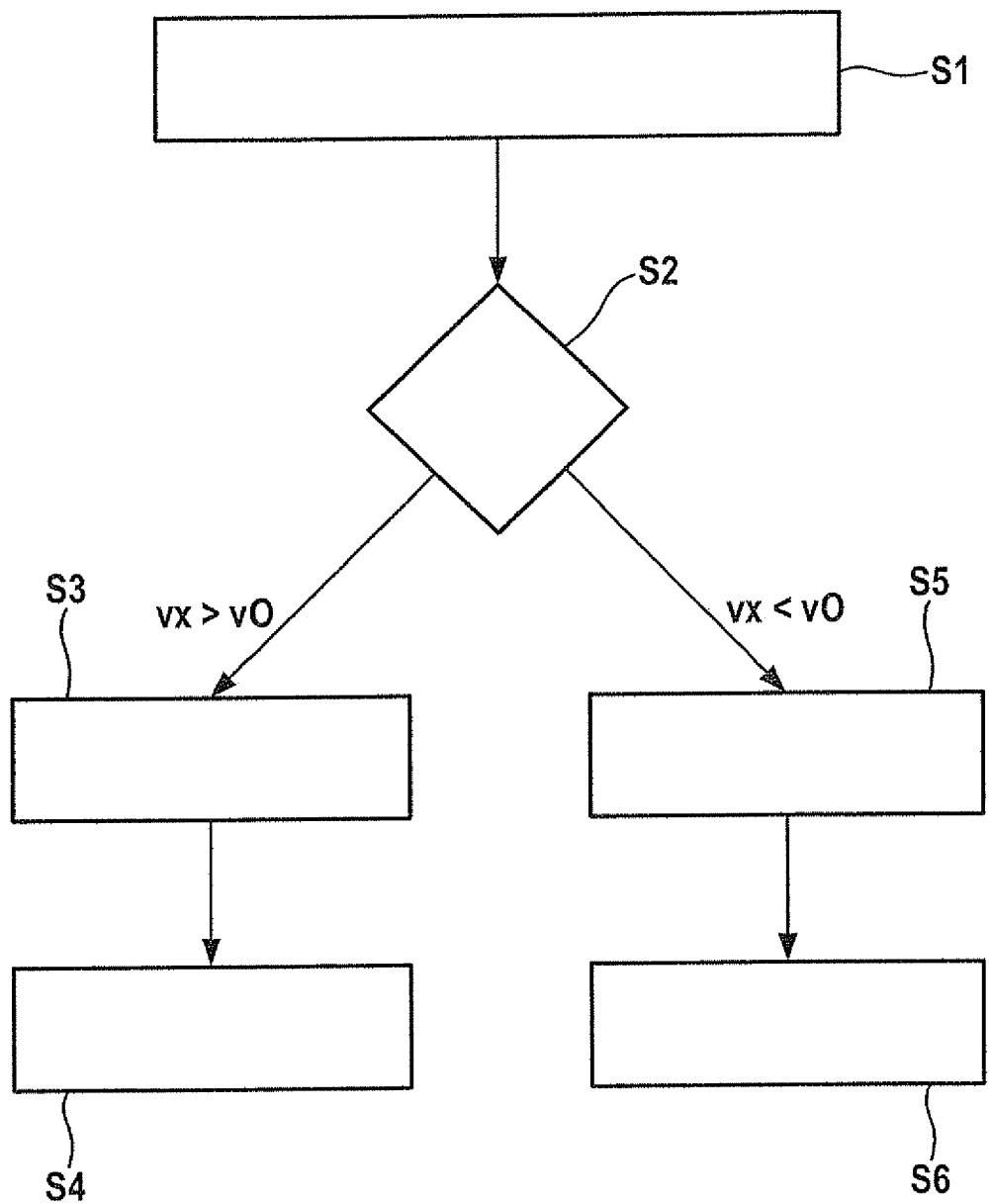
FIG. 1 is a flow diagram representing an example embodiment of the method for determining an item of travel direction information for a vehicle.

FIG. 1 shows a flow diagram representing an example embodiment of the method for determining an item of travel direction information for a vehicle.

In a first method step S1, a current speed vx of the moving vehicle is determined. Speed vx is preferably the longitudinal speed of the vehicle. Subsequently, in a method step S2 speed vx is compared with at least one specified comparison speed v0. In the method illustrated in FIG. 1, determined speed vx is compared only with comparison speed v0. In a further development, described below, of the method of FIG. 1, speed vx of the moving vehicle is compared with a first comparison speed and with a second comparison speed.

If speed vx of the vehicle is greater than the at least one specified comparison speed v0, then in a method step S3 a current yaw rate $\psi$ of the vehicle is determined. For the definition of the yaw rate $\psi$, see Equation 1:

$$\psi = \frac{v_x \cdot \delta_R}{(a+c) \cdot \left(1 + \frac{v_x^2}{v_{CH}^2}\right)} \quad \text{(Eq 1)}$$

where $v_{CH}$ is a characteristic speed, $\delta R$ is a wheel deflection angle, a is a distance of the front wheels from a vehicle center of gravity, and c is a distance of the rear wheels from the vehicle center of gravity.

In order to determine the yaw rate $\psi$, an individual wheel braking regulation system (ESP) of the vehicle may for example be used. In this manner, the method described here can be executed economically, using a component already existing in the vehicle. Because alternative methods for determining the yaw rate $\psi$ are conventional, this is not described in more detail here.

Above a minimum speed, which is frequently in a range around 30 kph, the centrifugal force acting on the vehicle during travel in a curve becomes significantly large. It is therefore advantageous to specify comparison speed v0 to be approximately 30 kph.

Starting from a comparison speed v0 of approximately 30 kph, the yaw rate $\psi$ of the vehicle can be determined with sufficient precision. The measurement imprecision that occurs in method step S3 during the determination of the yaw rate $\psi$ is therefore negligible.

In a further method step S4, an item of travel direction information is defined on the basis of the determined yaw rate ψ. The item of travel direction information may for example be a yaw rate that has been corrected with respect to speed-caused fluctuations, a wheel deflection angle δR, and/or a target steering wheel angle.

For example, the above-indicated Equation 1 may be transformed such that an Equation 2 results for the calculation of wheel deflection angle δR from a determined yaw rate ψ. Equation 2 is then as follows:

$$\delta_R = \frac{\psi \cdot (a+c) \cdot \left(1 + \frac{v_x^2}{v_{CH}^2}\right)}{v_x} \quad \text{(Eq 2)}$$

In the case in which a yaw rate corrected with regard to speed-caused fluctuations is to be determined as the item of travel direction information, the yaw rate ψ determined in method step S3 is provided in method step S4 as the corrected yaw rate.

If the determined speed vx of the vehicle is less than the at least one specified comparison speed v0, then in a method step S5 a first wheel path r1 of a first wheel of an axle of the vehicle, and a second wheel path r2 of a second wheel of the same axle, are determined. Because wheel paths r1 and r2 can be determined relatively precisely at a speed vx that is less than a maximum speed that as a rule is approximately 30 kph, method step S5 can be reliably executed with vx<v0.

In a subsequent method step S6, the item of travel direction information is determined on the basis of first wheel path r1 and second wheel path r2. For this purpose, a two-track model may be used. For example, the difference in the determined wheel paths r1 and r2 of the oppositely situated wheels of the axle are evaluated in order to calculate a wheel deflection angle δR as an item of travel direction information. A wheel deflection angle δR determined in this way provides reliable information about the position of the wheels of the vehicle.

Equation 3 provides an example of a two-track model for determining a yaw rate change Δψ0 corrected with regard to speed-caused fluctuations:

$$\Delta \psi 0 = \frac{r_1 - r_2}{b_a} \quad \text{(Eq 3)}$$

Here, $b_a$ is the axle width of the associated axle. In this way, using Equation 3 it is possible to provide a corrected yaw rate for a vehicle speed vx at which large measurement imprecisions occur when using a conventional measurement of yaw rate ψ.

A current vehicle direction specification can be determined before executing method step S3 or method step S5. The current travel direction specification is preferably a steering wheel angle. Subsequently, the determined travel direction specification can be compared with a specified value range. The value range advantageously corresponds to steering actions that can be safely carried out.

If the current travel direction specification is within the specified value range, the method is continued as described in the foregoing paragraphs. However, if the current travel direction specification is outside the specified value range, the method is terminated. In this manner, it is avoided that a too-extreme current travel direction specification results in a false result for the item of travel direction information.

The speed vx can be compared to at least one first specified comparison speed and with a second specified comparison speed. For example, the first comparison speed can be approximately 10 kph, while the second comparison speed is approximately 30 kph.

If speed vx is greater than the at least two comparison speeds, method steps S3 and S4 are executed. At a speed vx that is less than the at least two comparison speeds, method steps S5 and S6 are carried out corresponding to the above-described flow diagram of FIG. 1. If speed vx is greater than the first comparison speed and less than the second comparison speed, the item of travel direction information is calculated from a first item of partial travel direction information, determined corresponding to method steps S3 and S4 on the basis of the determined vehicle yaw rate ψ, and a second item of partial travel direction information determined corresponding to method steps S5 and S6 on the basis of first wheel path r1 and second wheel path r2. In this manner, determination of a reliable item of travel direction information is ensured even in a transition range of speed vx for which neither the procedure of method step S3 nor the procedure of method step S5 is regarded as suitable.

The item of travel direction information determined in method steps S4 and S6 may be used for example to determine a vehicle position with sufficient precision while parking the vehicle in a parking space. Via the determined item of travel direction information, the arc in which the vehicle is traveling relative to the parking space can be determined. Using the data provided by a wheel impulse counter, odometric methods can be applied in order to determine the position of the vehicle relative to the parking space at each point in time during the parking process.

Likewise, the item of travel direction information determined in method steps S4 and S6 can be used to reliably determine a conversion relation regarding a conversion of a travel direction specification into a direction of travel of the vehicle. Such a method is described in more detail below.

If in method steps S4 and S6 a target steering wheel angle is determined as an item of travel direction information, the target steering wheel angle can be compared, in a further method step, with a travel direction specification, for example a steering wheel angle. If a deviation is detected, the internal steering wheel angle conversion can be adapted.

The target steering wheel angle is to be understood as a position of the steering wheel that corresponds, with reference to a specification of the vehicle manufacturer or a repair shop, to the determined yaw rate ψ or to first wheel path r1 and second wheel path r2. In this manner, for example it can be determined whether the steering wheel angle conversion currently present in the vehicle still corresponds to a steering wheel angle conversion of the operation of the vehicle. It can also be checked whether the relation being used for converting a steering wheel angle into a wheel deflection angle δR is still adapted to the conditions currently present in the vehicle. If significant deviations are found here, a warning signal can be activated via which the driver is prompted to find a repair shop and to correct the errors in the vehicle.

If, for example due to a too-large track displacement of the vehicle, safe operation of a parking system is no longer ensured, the driver can be correspondingly informed. The driver can then decide himself whether he wishes to correct this problem by visiting a repair shop.

Figure 2:
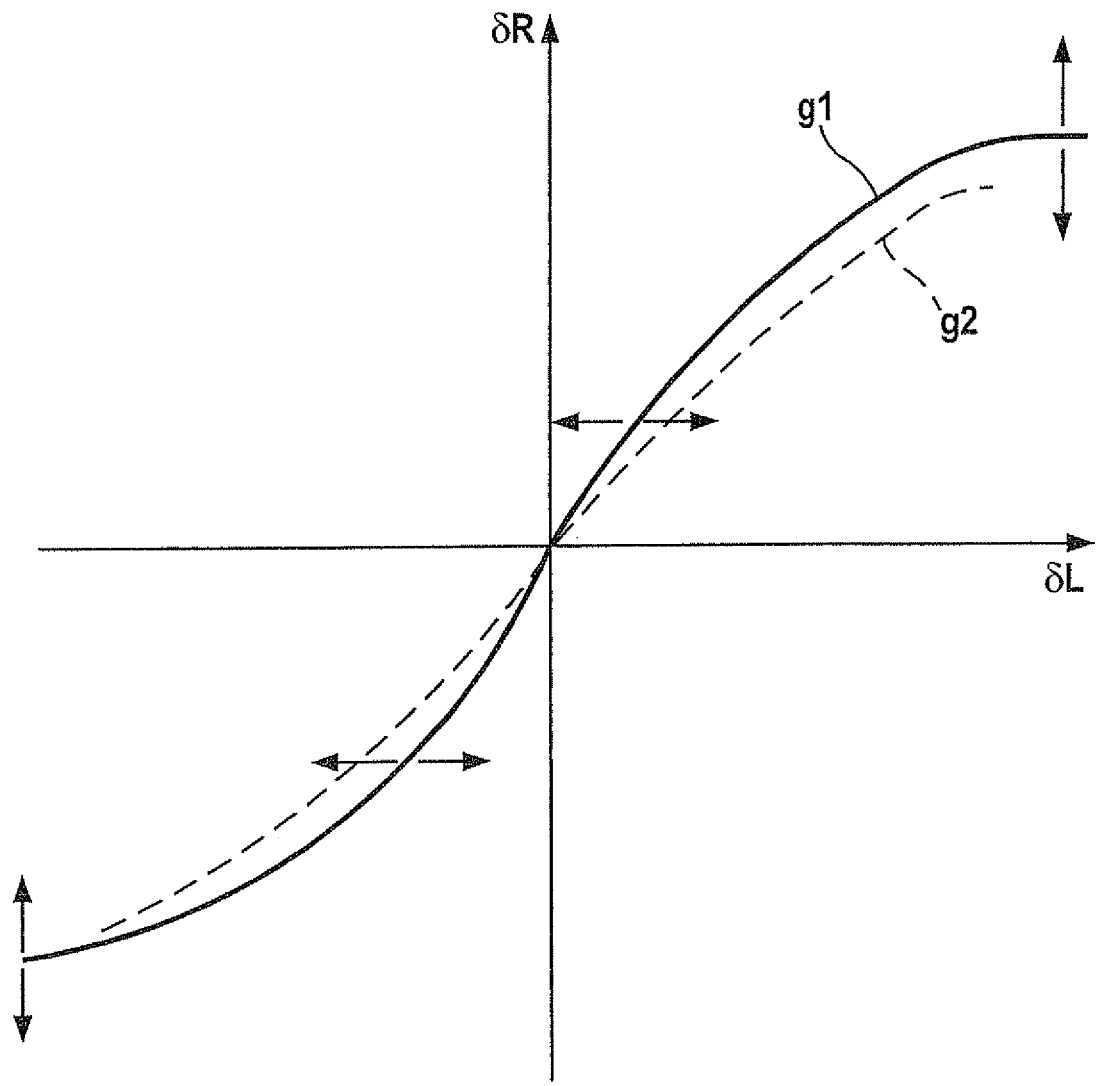
FIG. 2 is a coordinate system representing an example embodiment of the method for determining a conversion relation regarding a conversion of a travel direction specification into a travel direction of a vehicle.

FIG. 2 shows a coordinate system representing an example embodiment of the method for determining a conversion relation regarding a conversion of a travel direction specification into a direction of travel of a vehicle.

The method is executed for example in order to compensate aging of and/or damage to a component of the steering wheel angle conversion of the vehicle. In the example embodiment described here, the travel direction specification is a steering wheel angle $\delta L$ set at the steering wheel of the vehicle. The abscissa of the represented coordinate system thus indicates steering wheel angle $\delta L$ as the travel direction specification. The ordinate of the represented coordinate system reproduces the associated steering wheel angle $\delta R$ of the vehicle as the determined item of travel direction information.

The method here described below is not limited to a particular type of travel direction specification. For example, the travel direction input may also be outputted by a driver assistance system for an automatic travel direction specification, in particular a fully automatic parking assistance system that guides a vehicle into a parking space without actuation of the steering wheel on the part of the driver.

Graph g1 is a conversion relation specified before operation of the vehicle, for example by a vehicle manufacturer, regarding a conversion of a steering wheel angle $\delta L$ into a wheel deflection angle $\delta R$. During operation of the vehicle, graph g2 can be determined, which indicates an updated conversion relation regarding a conversion of a steering wheel angle $\delta L$ into a wheel deflection angle $\delta R$.

In order to determine graph g2, method steps S1 through S6, already described above, are carried out for a large number of steering wheel angles $\delta L$. Preferably, a distinction is made here between positive steering wheel angles $\delta L$ during forward travel of the vehicle and negative steering wheel angles $\delta L$ during reverse travel of the vehicle. After a wheel deflection angle $\delta R$ has been determined for each of a large number of positive steering wheel angles $\delta L$ and negative steering wheel angles $\delta L$, a compression or extension of the obtained curve can be carried out in order to obtain the depicted graph g2.

From a comparison of graphs g1 and g2, changes can be seen in at least one component of the steering wheel angle conversion. In addition, using the method described here a post-parametrization of the steering wheel angle conversion can be carried out easily and economically. Thus, a consistently high quality of the steering wheel angle conversion, and thus a safer operation of at least one on-board driver assistance system of the vehicle such as a parking system, is guaranteed even in the case of longer operation of the vehicle.

Figure 3:
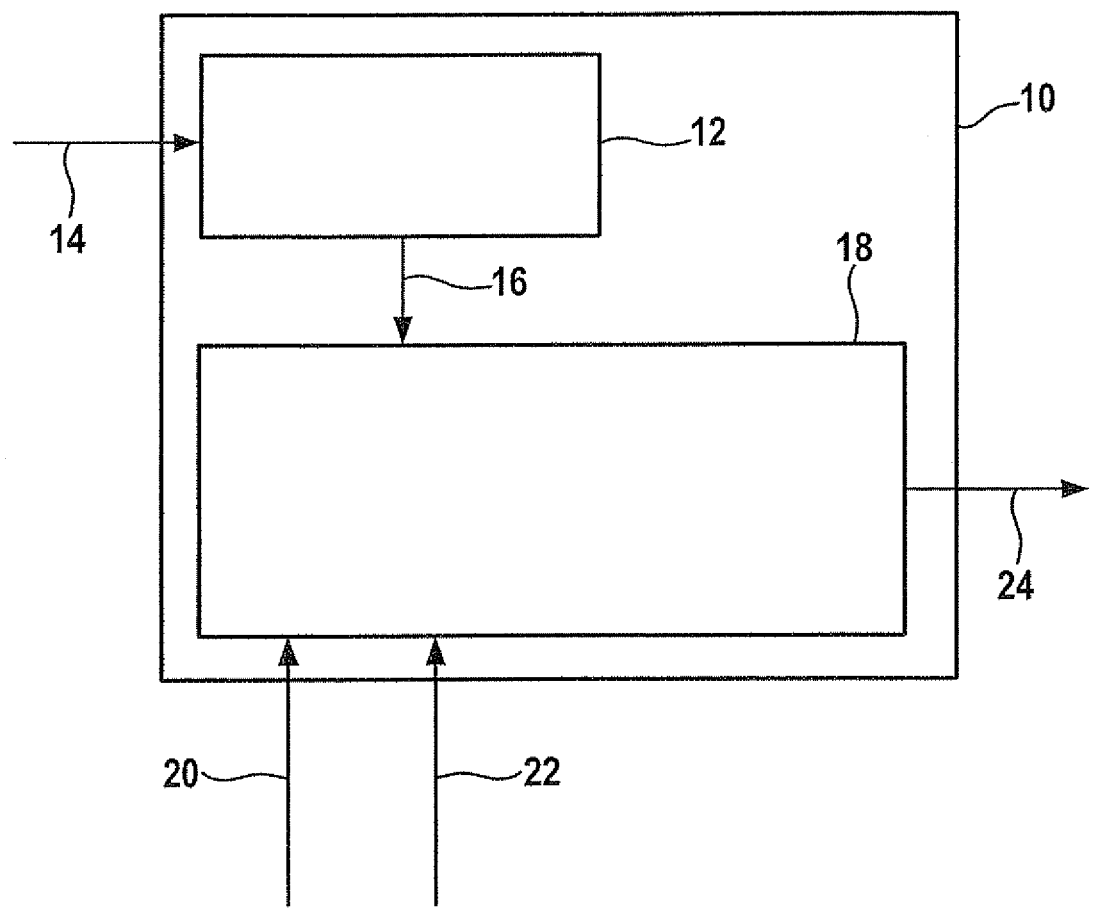
FIG. 3 is a block diagram representing an example embodiment of the sensor device for a vehicle.

FIG. 3 shows a block diagram showing an example embodiment of the sensor device for a vehicle.

Sensor device 10 has a comparator device 12 that is designed to receive a speed signal 14 outputted by a vehicle bus and to compare the speed corresponding to speed signal 14 with at least one comparison speed. As a function of the comparison of the speed with the at least one comparison speed, comparator device 12 outputs a switching signal 16 through which a computing device 18 can be switched into various operating modes.

In a first operating mode, computing device 18 is designed to determine an item of travel direction information on the basis of a yaw rate that is provided by the vehicle bus via a yaw rate signal 20. The item of travel direction information can include a yaw rate that is corrected with regard to speed-caused fluctuations, a wheel deflection angle, and/or a target steering wheel angle. The item of travel direction information determined by computing device 18 is subsequently outputted via an output signal 24. Computing device 18 is switched by switching signal 16 into the first operating mode if the current speed of the vehicle is greater than the at least one comparison speed.

Likewise, in a second operating mode computing device 18 is designed to determine the item of travel direction information on the basis of a first wheel path of a first wheel of an axle of the vehicle and a second wheel path of a second wheel of the axle. From the first wheel path and the second wheel path, computing device 18 takes a wheel path signal 22 that can also be provided via the vehicle bus. The determination of the item of travel direction information is preferably based on a two-track model. In this case as well, the item of travel direction information determined by computing device 18 is outputted via an output signal 24. Comparator device 12 is designed to switch computing device 18, using switching signal 16, into the second operating mode if the current speed of the vehicle is less than the at least one specified comparison speed.

Comparator device 12 may be designed to compare the speed of speed signal 14 with a first comparison speed and with a second comparison speed. If the current speed is greater than the two comparison speeds, comparator device 12 continues to switch computing device 18 into the first operating mode via switching signal 16. If, on the other hand, the current speed of the vehicle is less than the two comparison speeds, comparator device 12 switches computing device 18 into the second operating mode. If comparator device 12 determines that the current speed of the vehicle is between the first comparison speed and the second comparison speed, the comparator device switches computing device 18 into a third operating mode. In this case, in the third operating mode computing device 18 is designed to calculate the item of travel direction information from a first item of partial travel direction information that can be determined on the basis of the yaw rate and a second item of partial travel direction information that can be determined on the basis of the first wheel path and a second wheel path. For example, the item of travel direction information is a mean value of the two items of partial travel direction information.

Sensor device 10 can have an evaluation device that is designed to determine a conversion relation regarding a conversion of a travel direction specification into a direction of travel of the vehicle, on the basis of at least one travel direction specification provided by the vehicle bus and at least one associated item of travel direction information. Because such a sensor device 10 is readily understood to a person skilled in the art on the basis of FIG. 3, it is not described in more detail here.

Sensor device 10 can be for example a subunit of a warning system by which the conversion of a travel direction specification into a direction of travel of the vehicle is continuously monitored. If during this monitoring it is determined that significant deviations are present between a travel direction specification and an item of travel direction information determined with regard to the travel direction specification, a warning signal can be activated via which the driver is prompted to find a repair shop in order to correct the problem in the vehicle.

As an alternative, or in addition, sensor device 10 can also be a subunit of a driver assistance system for an automatic travel direction specification. In this case, the driver assistance system is preferably designed to correct or to optimize travel direction specifications with regard to their conversion as a function of the vehicle state, on the basis of the conversion relation determined by sensor device 10 regarding a conversion of a travel direction specification into a direction of travel of the vehicle.

What is claimed is:

1. A method for determining an item of travel direction information for a vehicle, comprising:
    determining a speed of the vehicle;
    comparing the speed with at least one specified comparison speed;
    if the speed is greater than the at least one specified comparison speed, determining a yaw rate of the vehicle and determining the item of travel direction information on the basis of the determined yaw rate; and if the speed is less than the at least one specified comparison speed, determining a first wheel path of a first wheel of an axle of the vehicle and of a second wheel path of a second wheel of the axle, and determining the item of travel direction information on the basis of the first wheel path and the second wheel path.

2. The method according to claim 1, wherein at least one of (a) a yaw rate corrected with regard to speed-caused fluctuations, (b) a wheel deflection angle (δR), and (c) a target steering wheel angle corresponds to the item of travel direction information.

3. The method according to claim 1, wherein the speed is compared to a first specified comparison speed and to a second specified comparison speed, and, if the speed is greater than the first specified comparison speed and less than the second specified comparison speed, the item of travel direction information is calculated from a first item of partial travel direction information determined on the basis of the determined yaw rate and on the basis of a second item of partial travel direction information determined on the basis of the first wheel path and the second wheel path.

4. A method for determining a conversion relation regarding a conversion of a travel direction specification into a direction of travel of the vehicle, comprising:
determining at least one item of travel direction information regarding at least one travel direction specification, including:
determining a speed of the vehicle;
comparing the speed with at least one specified comparison speed;
if the speed is greater than the at least one specified comparison speed, determining a yaw rate of the vehicle and determining the item of travel direction information on the basis of the determined yaw rate; and
if the speed is less than the at least one specified comparison speed, determining a first wheel path of a first wheel of an axle of the vehicle and of a second wheel path of a second wheel of the axle, and determining the item of travel direction information on the basis of the first wheel path and the second wheel path;
determining the conversion relation regarding the conversion of a travel direction specification into a direction of travel on the basis of the at least one travel direction specification and the at least one item of travel direction information.

5. The method according to claim 4, wherein a large number of items of travel direction information are determined for a large number of travel direction specifications in the case of a forward travel of the vehicle, and a large number of items of travel direction information are determined for a large number of travel direction specifications in the case of a reverse travel of the vehicle, and a conversion relation that is a function of forward and reverse travel being determined as the conversion relation.

6. A method for operating an automatic travel direction specification system of a vehicle, comprising:
outputting at least one travel direction specification by the automatic travel direction specification system;
determining a conversion relation regarding a conversion of a travel direction specification into a direction of travel of the vehicle, including:
determining at least one item of travel direction information regarding at least one travel direction specification, including:
determining a speed of the vehicle;
comparing the speed with at least one specified comparison speed;
if the speed is greater than the at least one specified comparison speed, determining a yaw rate of the vehicle and determining the item of travel direction information on the basis of the determined yaw rate; and
if the speed is less than the at least one specified comparison speed, determining a first wheel path of a first wheel of an axle of the vehicle and of a second wheel path of a second wheel of the axle, and determining the item of travel direction information on the basis of the first wheel path and the second wheel path;
determining the conversion relation regarding the conversion of a travel direction specification into a direction of travel on the basis of the at least one travel direction specification and the at least one item of travel direction information
determining a corrected travel direction specification for at least one additional travel direction specification of the automatic travel direction specification system, using the conversion relation.

7. A sensor device for a vehicle, comprising:
a computing device that, in a first operating mode, is adapted to determine an item of travel direction information on the basis of a yaw rate of the vehicle provided by an onboard data output system;
wherein the computing device adapted to be switched from the first operating mode into a second operating mode, the computing device adapted, in the second operating mode, to determine the item of travel direction information on the basis of a wheel path, provided by the onboard data output system, of a first wheel of an axle of the vehicle, and a second wheel path, provided by the onboard data output system, of a second wheel of the axle; and
a comparator device adapted to compare a speed of the vehicle provided by the onboard data output system with at least one specified comparison speed, and, if the speed is greater than the at least one specified comparison speed, to switch the computing device into the first operating mode, and, if the speed is less than the at least one specified comparison speed, to switch the computing device into the second operating mode.

8. The sensor device according to claim 7, wherein the computing device is adapted to be switched additionally at least into a third operating mode in which the computing device is adapted to calculate the item of travel direction information from a first item of partial travel direction information, which is determinable on the basis of the determined yaw rate, and a second item of partial travel direction information that is determinable on the basis of the first wheel path and the second wheel path, the comparator device adapted to compare the speed with a first specified comparison speed and with a second specified comparison speed, and, if the speed is greater than the first specified comparison speed and less than the second specified comparison speed, to switch the computing device into the third operating mode.

9. The sensor device according to claim 7, further comprising an evaluation device adapted to determine, on the basis of at least one travel direction specification provided by the data output system and at least one associated determined item of travel direction information, a conversion relation regarding a conversion of a travel direction specification into a direction of travel of the vehicle.

10. A vehicle, comprising:
a sensor, including:
- a computing device that, in a first operating mode, is adapted to determine an item of travel direction information on the basis of a yaw rate of the vehicle provided by an onboard data output system;
- wherein the computing device adapted to be switched from the first operating mode into a second operating mode, the computing device adapted, in the second operating mode, to determine the item of travel direction information on the basis of a wheel path, provided by the onboard data output system, of a first wheel of an axle of the vehicle, and a second wheel path, provided by the onboard data output system, of a second wheel of the axle; and
- a comparator device adapted to compare a speed of the vehicle provided by the onboard data output system with at least one specified comparison speed, and, if the speed is greater than the at least one specified comparison speed, to switch the computing device into the first operating mode, and, if the speed is less than the at least one specified comparison speed, to switch the computing device into the second operating mode;
- wherein the computing device is adapted to be switched additionally at least into a third operating mode in which the computing device is adapted to calculate the item of travel direction information from a first item of partial travel direction information, which is determinable on the basis of the determined yaw rate, and a second item of partial travel direction information that is determinable on the basis of the first wheel path and the second wheel path, the comparator device adapted to compare the speed with a first specified comparison speed and with a second specified comparison speed, and, if the speed is greater than the first specified comparison speed and less than the second specified comparison speed, to switch the computing device into the third operating mode;
- an evaluation device adapted to determine, on the basis of at least one travel direction specification provided by the data output system and at least one associated determined item of travel direction information, a conversion relation regarding a conversion of a travel direction specification into a direction of travel of the vehicle;
- an automatic travel direction specification system; and
- a travel direction correction device adapted to determine, for at least one additional travel direction specification of the automatic travel direction specification system, a corrected travel direction specification, using the conversion relation.

11. The method according to claim 1, wherein if the speed is greater than the at least one specified comparison speed, the first wheel path and the second wheel path are not determined, and if the speed is less than the at least one specified comparison speed, the yaw rate is not determined.

* * * * *